(12) United States Patent
Mehring

(10) Patent No.: US 6,670,894 B2
(45) Date of Patent: Dec. 30, 2003

(54) SYSTEM AND METHOD FOR KEYBOARD INDEPENDENT TOUCH TYPING

(76) Inventor: Carsten Mehring, 30 Bloomfield La., Las Flores, CA (US) 92688

( * ) Notice: Subject to any disclaimer, the term of this patent is extended or adjusted under 35 U.S.C. 154(b) by 182 days.

(21) Appl. No.: 10/061,885

(22) Filed: Feb. 1, 2002

(65) Prior Publication Data
US 2002/0105446 A1 Aug. 8, 2002

Related U.S. Application Data
(60) Provisional application No. 60/266,104, filed on Feb. 5, 2001.

(51) Int. Cl.$^7$ .............................................. H03K 17/965
(52) U.S. Cl. ......................... 341/22; 400/489; 365/169
(58) Field of Search .............................. 341/22, 20, 26, 341/21, 17; 345/168, 157, 158, 156, 171, 169, 173; 340/407.1, 407.2; 400/489, 87

(56) References Cited

U.S. PATENT DOCUMENTS

| | | |
|---|---|---|
| 5,288,158 A | 2/1994 | Matias |
| 5,552,782 A | 9/1996 | Horn |
| 5,581,484 A | 12/1996 | Prince |
| 5,764,794 A | 6/1998 | Perlin |
| 6,037,882 A | 3/2000 | Levy |
| 6,089,872 A | 7/2000 | Mayhue et al. |
| 6,097,374 A | 8/2000 | Howard |
| 6,102,594 A | 8/2000 | Strøm |
| 6,128,004 A | 10/2000 | McDowall et al. |
| 6,141,643 A | 10/2000 | Harmon |
| 6,237,846 B1 | 5/2001 | Lowell et al. |
| 6,304,840 B1 | 10/2001 | Vance et al. |
| 6,323,846 B1 | 11/2001 | Westerman et al. |

OTHER PUBLICATIONS

"Datahand Ergonomic Keyboards", www.datahand.com/flashsite/main.html.
Felong, Andy. "Andy's Wearable Computer Resource". http://redwoodhouse.com/wearable/index.html.
Textware Solutions. "The Fitali One–Finger Keyboard". www.twsolutions.com/fitaly.html.
Handykey Corporation, "Twiddler2", www.handykey.com.
Hollar, Seth, John Perng, and Brian Fisher. "Acceleration Sensing Glove", http://bsac.eecs.berkeley.edu/~shollar/fingeracc/fingeracc.html.

(List continued on next page.)

Primary Examiner—Michael Horabik
Assistant Examiner—Hung Dang
(74) Attorney, Agent, or Firm—Stetina Brunda Garred & Brucker (57) ABSTRACT

A finger-mounted data entry device that allows a user to enter information into a computing device without using a keyboard and a method of using the data entry device. The data entry device includes thumb contacts and finger contacts. The thumb contacts are positioned on the user's thumbs such that the thumb contacts represent rows of keys on a standard keyboard: a first thumb contact representing a base row of keys; a second thumb contact representing an upper row of keys; and a third thumb contact representing a lower row of keys. The finger contacts are positioned on each of the user's fingers such that touching one of the finger contacts with the first thumb contact generates a signal that is equivalent to the signal that would be generated if the user used touch typing to press a key in the base row of keys on the standard keyboard using the same finger, touching one of the finger contacts with the second thumb contact generates a signal that is equivalent to the signal that would be generated if the user used touch typing to press a key in the upper row of keys on the standard keyboard using the same finger, and touching one of the finger contacts with the third thumb contact generates a signal that is equivalent to the signal that would be generated if the user used touch typing to press a key in the lower row of keys on the standard keyboard using the same finger.

32 Claims, 11 Drawing Sheets

Left Hand (TOP)  Right Hand (TOP)

OTHER PUBLICATIONS

Hollar, Seth, John Kangchun Perng, and Kristofer S. J. Pister. "Wireless Static Hand Gesture Recognition with Accelerometers—The Acceleration Sensing Glove".

L3 Systems. "Wrist PC Keyboard". www.13sys.com/keybd/keybd.html.

Mayol, Walterio, Edgar Rodriguez, Luis Alfredo Flores Hernández & Victor Tapia Rangel. "The Wear Clam". www.robots.ox.ac.uk/~wmayol/WearClam//.

Matias Corporation. "Halfkeyboard", www.halfkeyboard.com.

Matias Corporation. "How it Works". www.halfkeyboard.com/propaganda/howit.html.

"MIThril". http://belladonna.media.mit.edu/projects/wearables.

NanoPac, Inc. Bat One Handed Keyboard by Infogrip, Inc., www.nanopac.com/Keyboard.htm.

Nissho Electronics Corp "New Type Bend Sensor". www.tradepia.or.jp/nevc/advanced/vr/vr5-e.htm.

"Digi–Type Glove". 1998. *Virtual Keyboard: Refinement and Implementation of the Virtual Keyboard*.

Pratt, Vaughan R. "Thumbcode: A Device–Independent Digital Sign Language". 1998. http://boole.stanford.edu/thumbcode/.

Rosenberg, Robert and Mel Slater. "The Chording Glove: A Glove–Based Text Input Device". 1999. *IEEE Transactions on Systems, Man, and Cybernetics—Part C: Applications and Reviews*, vol. 29, No. 2, May 1999.

Senseboard Technologies. "Senseboard Virtual Keyboard". www.senseboard.com/products.htm.

"Virtual Reality Glove". Popular Science, October, 1991. www.popsci.com.

Wearables Central. "Hardwear". http://wearables.blu.org.hardwear.html.

Wearables Central. "Key–Glove". http://www.wearables.blu.org/keyglove.html.

WetPC. "Kord Interface Technology". http://wetpc.com.au/html/.

Wirejunkie. "KeyGlove". www.wirejunkie.com/resources/wearable/keyglove/.

| Finger-Thumb Contact | Character |
|---|---|
| 1-B | A |
| 2-B | S |
| 3-B | D |
| 4-B | F |
| 4-BO | G |

Generation of left-hand base-line characters.

Fig. 4A

| Finger-Thumb Contact | Character |
|---|---|
| 1-A | Q |
| 2-A | W |
| 3-A | E |
| 4-A | R |
| 4-AO | T |

Generation of left-hand top-line characters.

Fig. 4B

| Finger-Thumb Contact | Character |
|---|---|
| 1-C | (Z) |
| 2-C | X |
| 3-C | C |
| 4-C | V |
| 4-CO | B |

Generation of left-hand bottom-line characters
(1-C contact is not used to code 'Z').

Fig. 4C

| Finger-Thumb Contact | Character |
|---|---|
| 5-EO | H |
| 5-E | J |
| 6-E | K |
| 7E | L |
| 8-E | Z |

Generation of right-hand base-line characters
(8-E contact is used to code 'Z').

Fig. 4D

| Finger-Thumb Contact | Character |
|---|---|
| 5-DO | Y |
| 5-D | U |
| 6-D | I |
| 7-D | O |
| 8-D | P |

Generation of right-hand top-line characters.

Fig. 4E

| Finger-Thumb Contact | Character |
|---|---|
| 5-FO | N |
| 5-F | M |
| 6-F | <, |
| 7-F | >. |
| 8-F | ?/ |

Generation of right-hand bottom-line characters.

Fig. 4F

| Finger-Thumb Contact | Character |
|---|---|
| 1-AO | 1 ! |
| 2-AO | 2 @ |
| 2-BO | 3 # |
| 3-AO | 4 $ |
| 3-BO | 5 % |

Generation of numbers 1-5 or 'special' characters (using 'Shift').

Fig. 4G

| Finger-Thumb Contact | Character |
|---|---|
| 8-DO | 0 ) |
| 7-DO | 9 ( |
| 7-EO | 8 * |
| 6-DO | 7 & |
| 6-EO | 6 ^ |

Generation of numbers 6-0 or 'special' characters (using 'Shift').

SYSTEM AND METHOD FOR KEYBOARD INDEPENDENT TOUCH TYPING

CROSS-REFERENCE TO RELATED APPLICATIONS

This application claims the benefit of U.S. Provisional Application No. 60/266,104, filed Feb. 5, 2001, the entire contents of which are hereby incorporated by reference.

STATEMENT RE: FEDERALLY SPONSORED RESEARCH/DEVELOPMENT (Not Applicable)

BACKGROUND OF THE INVENTION

The present invention generally relates to computer data entry and more particularly to a keyboardless method of computer entry using electric contacts positioned on a user's fingers and thumbs.

A common method for entering information into a computer is via a keyboard, such as a 101-key type keyboard. These keyboards tend to be fairly large and relatively heavy, and thus are typically placed on a support surface, such as a desk or table.

The size and weight of typical keyboards, such as those used with a desktop computer, make them poor candidates for use with mobile computing devices, such as personal digital assistants (PDAs) or pocket personal computers (PCs) which can be about the size of a cigarette box yet provide computational resources comparable to those of desktop computers. Such mobile computing devices typically include a miniature keyboard, for example a miniature keyboard that may be worn on the user's wrist or an image of a keyboard that is displayed on the screen that requires the user to press the keys with a stylus or using an attached device that requires the user to input data using his thumbs. Such data entry is difficult and error prone and does not allow the user to enter data at a sufficient speed. Other devices for data input for mobile devices, such as pocket PCs, include chording devices (such as a keypad that requires the user to press different key combinations to generate the various characters found on a standard keyboard) or the use of microphones in combination with voice recognition software. The former input devices typically do not meet the data input rates desired by the users of mobile computing devices (particularly pocket PCs) or they require the user to learn a chording/coding language particular to the specific design. On the other hand, privacy concerns limit the use of voice recognition devices; for example, input of confidential or sensitive data via voice recognition devices is not feasible in conferences, in meetings, or in crowded or noisy public places, such as bus stops or airports.

As keyboard size is shrunk in order to increase portability, so does the speed at which information can be entered into the computing device. Thus, there is a need for a device that allows the user of a mobile computing device to enter information into the mobile computing device at a relatively fast speed without using a full-size or miniaturized keyboard.

There are several devices and methods of using such devices that solve the problem of data entry without requiring the use of a traditional full-size or miniaturized keyboard. One method is a folding keyboard. While more compact than a traditional full-size keyboard, particularly in the folded state during transport, a folding keyboard is still relatively large in the unfolded stage and requires approximately the same size support surface as that required for a traditional full-size keyboard. Another device is a keyboard employing a reduced number of full size keys, for example, a one-handed keyboard or half-keyboard, such as the ones disclosed in U.S. Pat. No. 5,288,158 entitled ONE-HANDED KEYBOARD and U.S. Pat. No. 6,102,594 entitled KEYBOARD FOR TOUCH TYPING USING ONLY ONE HAND. These keyboards use one half of a traditional keyboard whereby now a single key represents two characters. A specified key sequence, such as holding down the space bar while "typing" toggles between the two sets of characters. For example, the character "F" may be located at the position where the user's index finger is placed onto the half-keyboard (assuming the hand being used is the left hand). That same position key would represent the character "J" (which is normally pressed by the user's right index finger) when the half-keyboard is toggled. Even though half-keyboards are significantly smaller than traditional keyboards, half-keyboards still require a support surface.

U.S. Pat. No. 6,237,846 entitled BODY WEARABLE KEYBOARD solves the problem of requiring a support surface by providing a full size keyboard that has key clusters that can be moved or rotated so that the keyboard can be used in a conventional manner on a support surface or worn on the body. This device resolves the need for a support surface. However, many users may not wish to carry around a keyboard that is relatively heavy and bulky compared to the mobile computing device. Thus, it is desirable to have a device for entering information (e.g., alphanumeric text) into a computer, for example, a mobile computer, such as a pocket PC, without the use of a keyboard.

There are several devices and methods of using such devices that solve the problem of data entry without requiring a keyboard. Many of these devices use finger or hand mounted sensors in order to generate the signals that would normally be generated by pressing a key on the keyboard. Electric contacts may, for example, be attached to gloves or mittens that are worn on a user's hands.

U.S. Pat. No. 5,581,484 entitled FINGER MOUNTED COMPUTER INPUT DEVICE discloses a glove having pressure sensors which are worn on a user's fingers. Generally speaking, U.S. Pat. No. 5,581,484 discloses a device that senses finger positioning with respect to a solid surface, the latter being treated as a standard keyboard. The user uses traditional touch-typing skills on any flat surface. Based on the characteristic finger positions when typing a character on a standard keyboard, the device is able to use the hand mounted sensors to interpret finger position with respect to the solid surface as the same character that the user would have typed if the solid surface were a keyboard. Devices such as the one disclosed in U.S. Pat. No. 5,581,484 have the advantage that they are easy to use since they mimic touch-typing skills. However, even though devices such as the one disclosed in U.S. Pat. No. 5,581,484 do not require a surface for supporting a keyboard, they do require a surface for the user to type on as if the user were typing on a keyboard. An additional disadvantage of devices such as the one disclosed in U.S. Pat. No. 5,581,484 is that they are subject to inadvertent, erroneous input. For example, if a user scratches his nose, the device will detect pressure and will generate spurious characters. Thus, corrections must be made or the device must be turned off if the user makes any non-typing movements with his hands.

U.S. Pat. No. 6,304,840 entitled FINGERLESS GLOVE FOR INTERACTING WITH DATA PROCESSING SYS- TEM discloses a fingerless glove that is similar to the device disclosed in U.S. Pat. No. 5,581,484. While this device does overcome some of the disadvantages associated with the device disclosed in U.S. Pat. No. 5,581,484, such as erroneous input due to user movements, the device disclosed in U.S. Pat. No. 6,304,840 does require a surface for the user to type on as if the user were typing on a keyboard.

Thus, there is a need for a method of entry information into a mobile computing device without a keyboard and without requiring a support surface for entering the information. This need is addressed in the paper *The Chording Glove: A Glove-Based Text Input Device* by Robert Rosenberg and Mel Slater which discloses a glove having contacts at various positions on a user's fingers and thumbs. The device is similar to a chording device/keyboard. Instead of pressing a single key, various combinations of contacts are pressed simultaneously in order to generate the signal that would be generated by pressing an individual key on a standard keyboard. The various signals are generated by simultaneously contacting from 2–5 contacts. Although chording gloves like other handheld chording devices overcome the problem of requiring a support surface, use of such systems require substantial training as the user has to essentially learn a new coding language.

The paper *Thumbcode: A Device-Independent Digital Sign Language* by Vaughan R. Pratt discloses a system for entering information into a computing device using contact on the fingers and thumbs. The thumb contact on one of the user's hands is closed with a contact on one of the fingers. Additionally, the user must either place fingers in contact with each other or space them apart in order to determine the intended character. As with chording, thumbcoding requires a user to essentially learn a new coding language in order to enter data into the computing device.

U.S. Pat. No. 6,097,374 titled WRIST-PENDENT WIRELESS OPTICAL KEYBOARD discloses a method in which signal input is achieved via finger motion over an optical reflectance matrix generated above the palms of the user's hands. In principle, this system can be used to achieve data input via touch typing without keyboard. However, generation of the optical matrix and detection of finger position in this matrix is fairly complicated. Furthermore, the system has to be calibrated (possibly in real time) for specific ambient conditions, such as strong ambient illumination or electromagnetic interference. In fact, in U.S. Pat. No. 6,097,374, the use of keypads fixed to the wrist of the user and located below the palms of the user is suggested or considered necessary for certain applications. The lack of tactile feedback (providing confirmation of data input to the user analogous to touch-typing on a keyboard) may result in lower data input rates. Furthermore, the use of an optical reflection matrix, such as the one disclosed in U.S. Pat. No. 6,097,374, to detect signal input by predicting finger position with respect to the optical matrix below the user's hands does not allow for free finger motion without the risk of data input. Rather, the user has to hold the hands and fingers in a more-or-less stretched out position in order to omit interference with the optical matrix.

The devices described above are too large, are user unfriendly in an ergonomic sense, do not allow users to enter information at sufficient speeds, require a support surface, require the user to learn a new coding language, or some combination thereof. Most user's when confronted with having to learn an entirely new coding language in order to enter information into a computing device will likely opt not to use such a device. Thus, to achieve truly portable computing capabilities (e.g., using a pocket PC with an attached eye-glass display while walking or standing at a bus stop), there is a need for a keyboardless input device that is easy and comfortable to use, that allows for relatively fast data entry speeds, and that does not require significant training time. The device should be simple in its technical design and inexpensive.

BRIEF SUMMARY OF THE INVENTION

The present invention provides a data entry device and a method of using the data entry device that allow a user to enter information into a computing device without using a keyboard. The data entry device includes thumb contacts and finger contacts. The thumb contacts are positioned on the user's thumbs to represent rows of keys on a standard keyboard. A first thumb contact represents a base row of keys, a second thumb contact represents an upper row of keys, and a third thumb contact represents a lower row of keys. The finger contacts are positioned on each of the user's fingers such that touching one of the finger contacts with the first thumb contact generates a signal that is equivalent to the signal that would be generated if the user used touch typing to press a key in the base row of keys on the standard keyboard using the same finger, touching one of the finger contacts with the second thumb contact generates a signal that is equivalent to the signal that would be generated if the user used touch typing to press a key in the upper row of keys on the standard keyboard using the same finger, and touching one of the finger contacts with the third thumb contact generates a signal that is equivalent to the signal that would be generated if the user used touch typing to press a key in the lower row of keys on the standard keyboard using the same finger.

Preferably, the finger contacts are positioned at the user's fingertips.

Preferably, the data entry device includes fourth, fifth and sixth thumb contacts that are used to generate signals that are equivalent to signals generated by additional keys on the standard keyboard since some fingers are used to press multiple keys in the same row and since a fourth thumb contact located on the palm-side of the thumb, representing a fourth row of numeric keys on a traditional keyboard, has not been used here.

The signal generated is transmitted to the computing device.

Supplemental finger contacts may be used for producing signals representing special characters. There may be three supplemental finger contacts on each finger. One supplemental finger contact may be located proximate a first segment of the user's finger, one supplemental finger contact may be located proximate a second segment of the user's finger and one supplemental finger contact may be located proximate a third segment of the user's finger. Signals representing special characters are generated by touching/closing a supplemental finger contact with the thumb contact located on the palm-side tip of the thumb on the same hand. Additional supplemental contacts may be used to generate digits 0–9 and may be positioned on the finger tips, e.g., on or above the finger nails.

The data entry device may be used to generate alphanumeric signals using fingering that is similar to the fingering used for touch typing on a QWERTY keyboard.

The finger contacts and thumb contacts may be attached to a glove that is worn by the user. Alternatively, the finger contacts and the thumb contacts may be attached to a flexible skeletal structure that is worn by the user. The flexible skeletal structure may have attached clips that are configured to hold the contacts at the appropriate position on the user's fingers. As another alternative, the finger contacts and the thumb contacts may be located on rings that are worn on the user's fingers and thumbs. An application and retrieving device may be used for placing the rings on or removing the rings off of the user's fingers and thumbs.

The thumb contacts and finger contacts may be positioned on both of the user's hands. Alternatively, the finger and thumb contacts may be positioned on one hand to simulate a half-keyboard. A sensor is added to determine the position of the user's hand. One position is used to generate signals equivalent to those in one configuration of the half-keyboard. A second positioning of the user's hand is used to generate the signals that are generated when the half-keyboard is toggled to the second or alternate character set.

In order to use the data entry device, finger contacts are positioned on the user's fingers and thumb contacts are positioned on the user's thumbs. The user closes (or touches) a finger contact and a thumb contact to generate a signal that is equivalent to the signal that would be generated by pressing a key on a keyboard using similar fingering, particularly for alphanumeric characters. In response to closing the finger contact and the thumb contact, the signal that is equivalent to the signal that would be generated by pressing the key on a keyboard using similar fingering is generated. The generated signal is transmitted to the computing device.

BRIEF DESCRIPTION OF THE DRAWINGS

These as well as other features of the present invention will become more apparent upon reference to the drawings wherein.

DETAILED DESCRIPTION OF THE INVENTION

The present invention allows a user to input data into a computing device without a keyboard in a manner that uses fingering that is similar to that used when entering data using touch typing on a standard keyboard. The invention uses contacts on a user's fingers and thumbs. The invention allows for arbitrary finger motion without data input, as long as finger contacts and thumb contacts on a single hand do not meet. Thus, the present invention does not put severe restrictions on the user's freedom of hand motion without data input. As described below, contacting one of the finger contacts with one of the thumb contacts on the same hand generates the same signal as would be generated by depressing a key on a keyboard.

Figure 1:
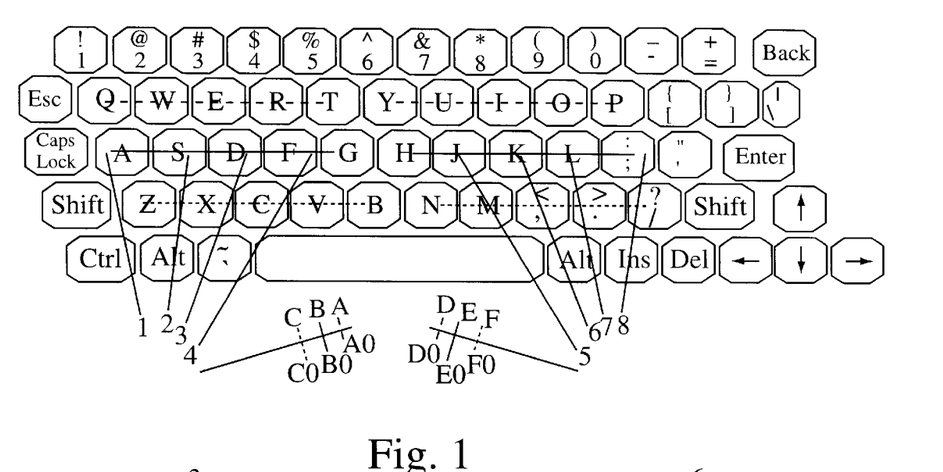
FIG. 1 illustrates a standard U.S. keyboard (QWERTY keyboard) with annotations indicating contacts used in accordance with the present invention to generate the same signal for alphabetic character input that would be generated by pressing the key on the keyboard.

Referring now to the drawings wherein the showings are for purposes of illustrating preferred embodiments of the present invention only, and not for purposes of limiting the same, FIG. 1 illustrates a standard QWERTY keyboard. The present invention is discussed with reference to a QWERTY keyboard such as the one shown in FIG. 1. However, it will be appreciated that the present invention could be implemented to simulate touch typing performed on other types of keyboards, such as a Dvorak keyboard or a half-keyboard. Using the standard QWERTY keyboard shown in FIG. 1, a user's fingers are normally in a home position that includes placing the left fifth finger (also known as the digitus minimus or pinky finger) on the "A" key, the left fourth finger (also known as the digitus annularis or ring finger) on the "S" key, the left third finger (also known as the digitus medius or middle finger) on the "D" key and the left second finger (also known as the index finger) on the "F" key. The home position for the right hand includes placement of the right second finger on the "J" key, the right third finger on the "K" key, the right fourth finger on the "L" key and the right fifth finger on the ";" key. This row ("ASDF . . . ") which is annotated in FIG. 1 with a solid line may be referred to as the base row. The row above the base row ("QWERTY . . . ") which is annotated with a long dash line may be referred to as the top row and the row below the base row ("ZXCV . . . ") which is annotated with a short dash line may be referred to as the bottom row.

Figure 2:
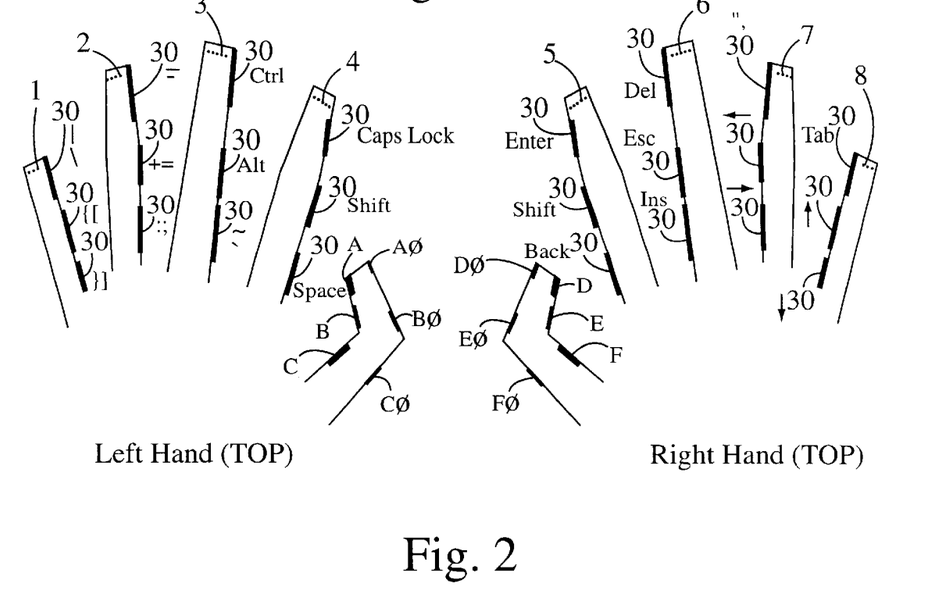
FIG. 2 illustrates placement of contacts on a user's fingers and thumbs to generate signals for alphabetic and special character input.

FIG. 2 illustrates the positions of electric contacts 1–8, A–F, A0–F0, 30 with respect to a user's fingers and thumbs. As shown in FIG. 2 by dashed lines, finger contacts 1–8 are located on the palm-side of the user's hand near the tops of the fingers or the fingertips. There is one finger contact 1–8 on each of the second, third, fourth and fifth fingers on each hand. There are six thumb contacts A–F, A0–F0 on each first finger (also known as a thumb). As described in more detail below, signals for letters A–Z, and in one embodiment of the invention also numbers 0–9, are generated by contacting a finger contact 1–8 on one of the eight fingertips on the second-fifth fingers with one of the six thumb contacts A–F, A0–F0 on the same hand as the contacted finger contact 1–8.

As shown in FIG. 2, preferably, there are supplemental finger contacts 30 located along the sides of the user's fingers located nearest the user's thumbs. As shown in FIG. 2, any given finger may have three supplemental contacts 30 located along the side of the finger, with one supplemental contact 30 located proximate a first segment of the user's finger (e.g., near the top of the user's finger), one supplemental contact 30 located proximate a second segment of the user's finger (e.g., in the middle of the user's finger) and one supplemental contact 30 located proximate a third segment of the user's finger (e.g., near the base of the user's finger). These supplemental contacts 30 are used to generate signals representing special characters as shown on FIG. 2. For example, the supplemental contacts 30 located near the base and middle of the forth and fifth fingers of the right hand are used to generate the same signals that would be generated by the arrow (left, right, up and down) keys. A signal is generated by contacting a particular supplemental contact 30 with the thumb contact A, D located on the inside tip of the thumb of the same hand. In other words, "thumb-coding" is used for these special characters due to the infrequent use of the special characters.

Figure 3:
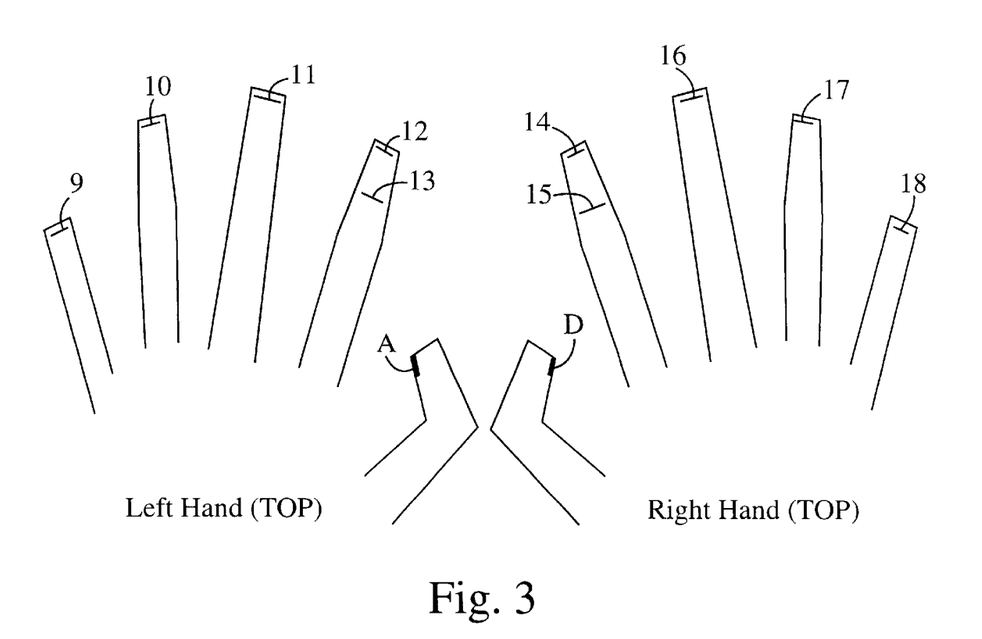
FIG. 3 illustrates placement of supplemental contacts on the back of a user's fingers as an alternative way to generate signals for numbers 0–9 by combining the supplemental contact with a thumb contact of the same hand.

As shown in FIG. 3, supplemental contacts 9–18 may be located on the fingernails or neighboring finger segments for input of the characters representing the digits 0–9. Upon using the "Shift" contacts, several special characters can be generated using the supplemental contacts 9–18 shown in FIG. 3. Data input for digits 1–5 is achieved by closing finger contacts 9–13 with thumb contact A and data input for digits 6–9 and 0 is achieved by closing finger contacts 14–18 with thumb contact D. Using the supplemental contacts 9–18 for input of digits 0–9 still uses fingering or finger movement analogous to the fingering on a standard keyboard; however, now signal input is not achieved by combining a contact on the inside tip of the fingers with a thumb contact but rather by combining a contact on the outside or nail-side of the finger tips with the thumb contact located on the palm-side tip of the thumb of the same hand. In other words, when using contacts 9–18 the thumb contacts A, D represent a fourth row of keys on a standard keyboard carrying the number keys.

Figure 4A:
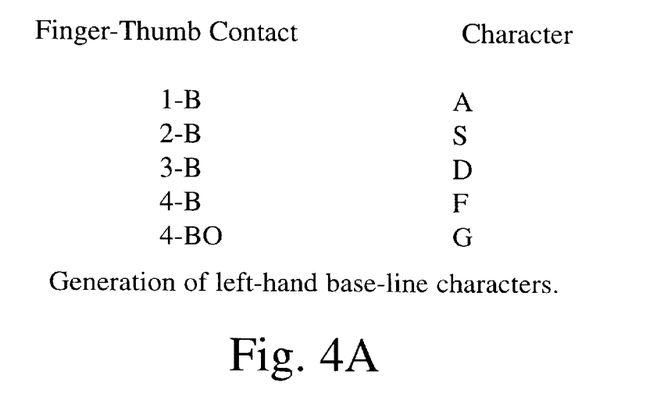
FIGS. 4A–4H are tables identifying finger/thumb contact combinations used to generate various signals.
Figure 4B:
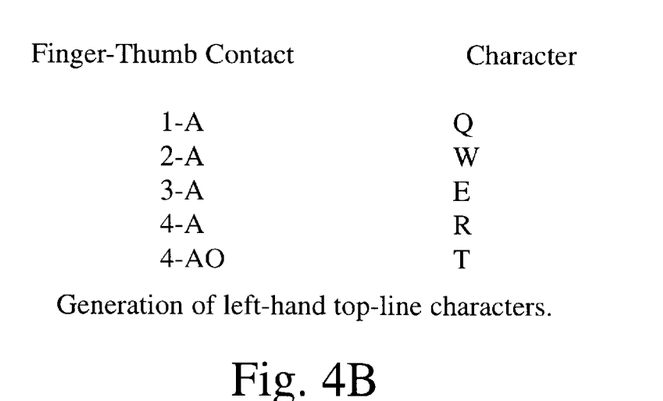
Figure 4C:
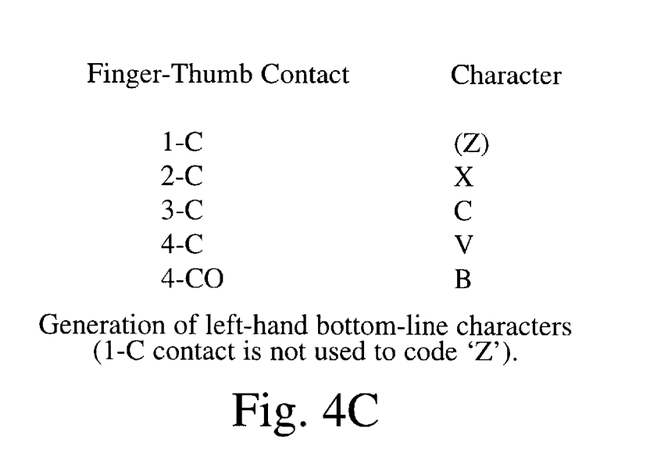
Figure 4D:
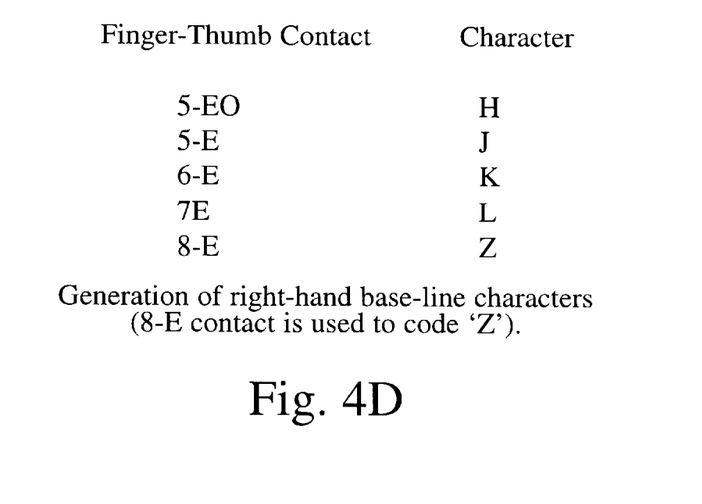
Figure 4E:
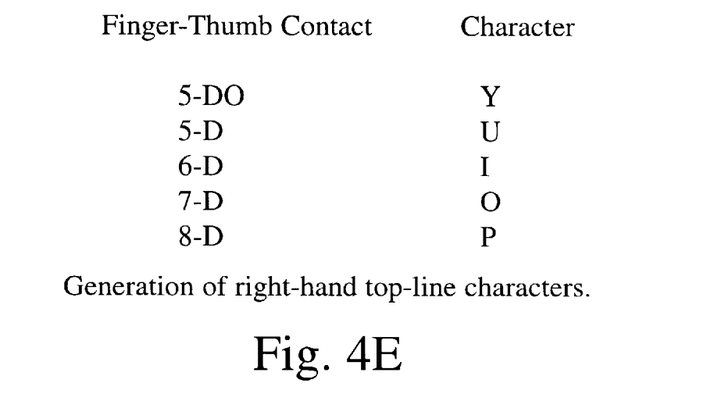
Figure 4F:
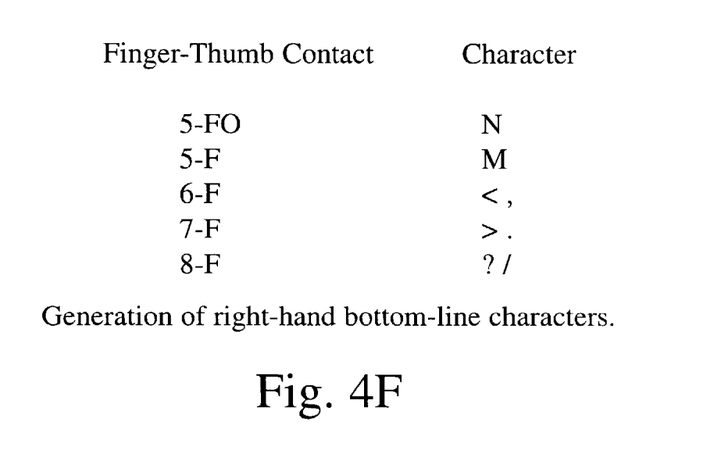
Figure 4G:
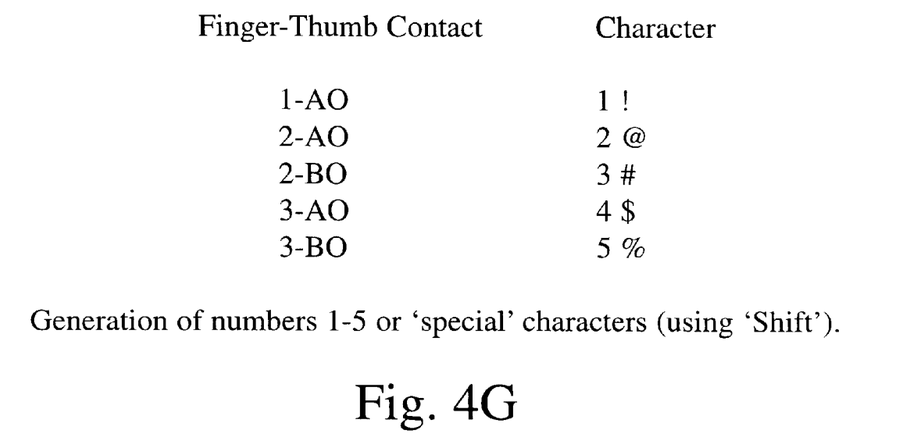
Figure 4H:
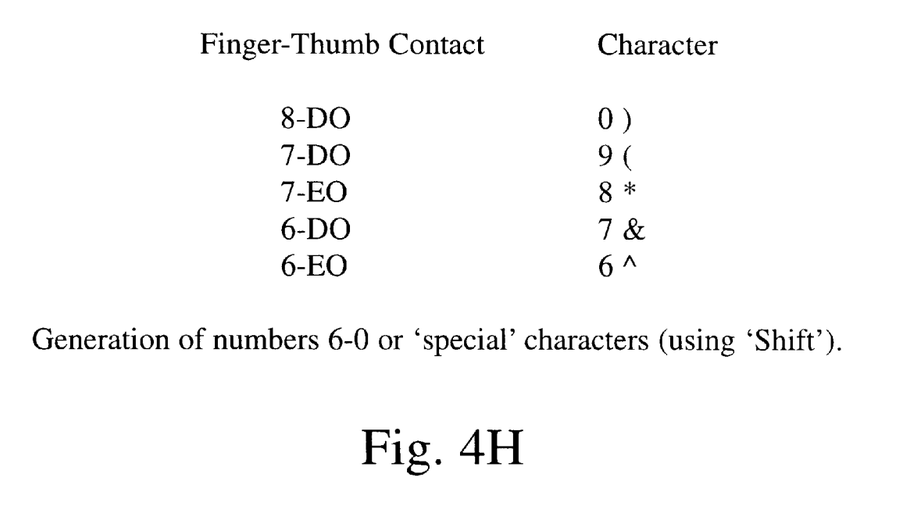

FIGS. 4A–4H are tables illustrating finger-thumb contact combinations used to generate the signals that would be generated for the keys on a standard computing keyboard, such as a QWERTY keyboard. The middle thumb contacts B, E are used for characters in the base row. The top thumb contacts A, D are used for characters in the top row and the bottom thumb contacts C, F are used for characters in the bottom row. For example, the character "A" is the character that would be typed using the fifth finger of the left hand in the home (base row) position. The signal representing the character "A" is generated when the finger contact 1 on the fifth finger of the left hand is closed with the thumb contact B which represents the base row and is located in the middle portion of the first finger or thumb on the inside (side nearest the second-fifth fingers). Since the left fifth finger is used to press the "Q" character located on the upper row of a keyboard, the signal representing the character "Q" is generated by closing contact between the fifth finger contact 1 and the top thumb contact A. As can be seen in FIGS. 1 and 4B, the combination of finger contact 1 and thumb contact A is used to generate the signal representing the character "Q." Since the second finger is used to reach two characters on a given row, a second thumb contact A0–F0 for each row is located on the back or outside of the user's thumb. For example, to generate the signal representing the character "F", the finger-thumb contact combination 4-B is used. The contact combination used to generate the character "G" is 4-B0 which is contact of the left second finger 4 and the center contact on the outside of the user's left thumb B0. Note that, due to ergonomic reasons, finger-thumb contact 1-C is not used to generate 'Z' but rather 8-E. Accordingly (:,;) is generated by one of the supplemental contacts 30. In one preferred embodiment of the invention, contacts A0, B0 and D0, E0 are also used in combination with finger contacts 1–3 and 6–8 in order to generate numeric input (digits 0–9) as shown in FIGS. 4G and 4H. Here, two thumb contacts on the back-side of each thumb A0, B0, D0, E0 are used to represent a fourth row of keys on a standard keyboard (above the prescribed upper row) in order to mimic input of digits 0–9 using fingers three–five of each hand. In this configuration, fingering is still similar to fingering familiar from touch-typing on a standard keyboard, even though only fingers three–five of each hand are used. The prescribed method to generate numeric data input (as well as the alternative method using contacts 9–18), avoids the need of placing four thumb contacts on the inside of each thumb in order to mimic a total of four rows on a standard keyboard. The latter is problematic considering the finite size of the electrical contacts and the limited area on the inside thumb which is easily accessible by the finger contacts on the palm-side tips of the fingers.

Figure 5:
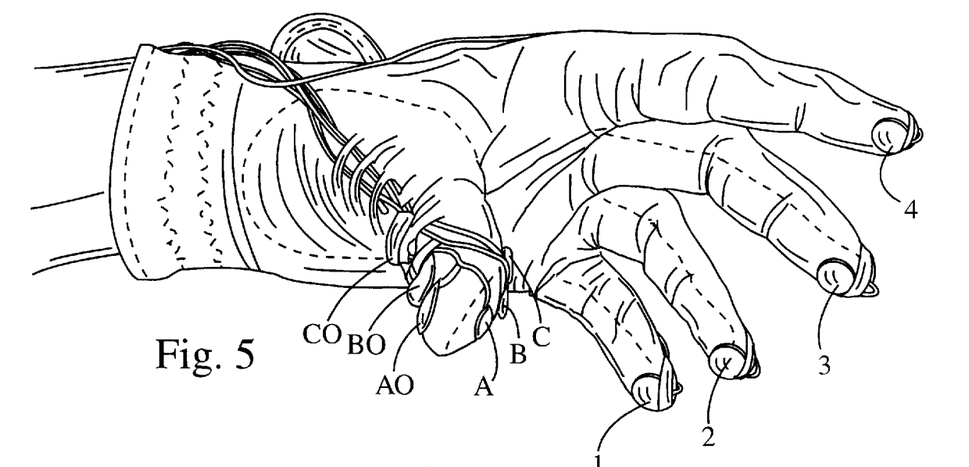
FIG. 5 illustrates a first embodiment of implementing the present invention wherein the contacts are attached to gloves (only the left hand glove is shown carrying only contacts for alphabetic character input)

Once a finger-thumb contact has been established, various methods can be used to generate the signals. For example, wires from the contacts may be connected to a keyboard encoder. Keyboard encoders are small in size. For example, a typical keyboard encoder measures 1 cm×3 cm and has a height of about 3 mm. The keyboard encoder may be located on top of the user's hand. For example, the keyboard encoder may be attached to a glove, such as the one shown in FIG. 5, or a skeletal structure, such as the one shown in FIG. 6A. The signal that is generated can then be transmitted to the computing device via wire or wireless, e.g., infrared (IR) or the like. The computing device can then display the character represented by the signal. Techniques for generating and transmitting the signals associated with keys on a keyboard, and accordingly here with the closure of two electrical contacts, are known in the art and are not discussed in further detail herein.

FIGS. 5–8 illustrate various configurations that may be used for implementing the present invention. In the embodiment shown in FIG. 5, the contacts are attached to gloves (only one glove is shown carrying only contacts for alphabetic character input). The contacts are connected by wires to the encoder and transfer electronics. Preferably, the gloves are fairly thin and lightweight, thereby allowing the user to easily manipulate his fingers.

Figure 6A:
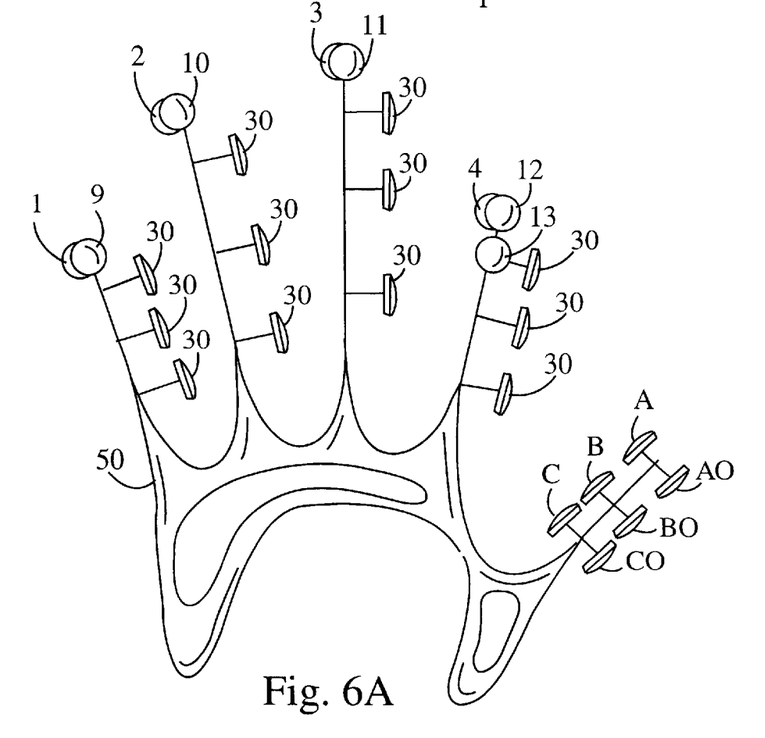
FIGS. 6A and 6B illustrate a second embodiment of the present invention wherein clips having attached contacts are attached to a flexible skeletal structure worn on the user's hands (only the left hand skeletal structure is shown)
Figures 6B, 7A, 7B, 7C:
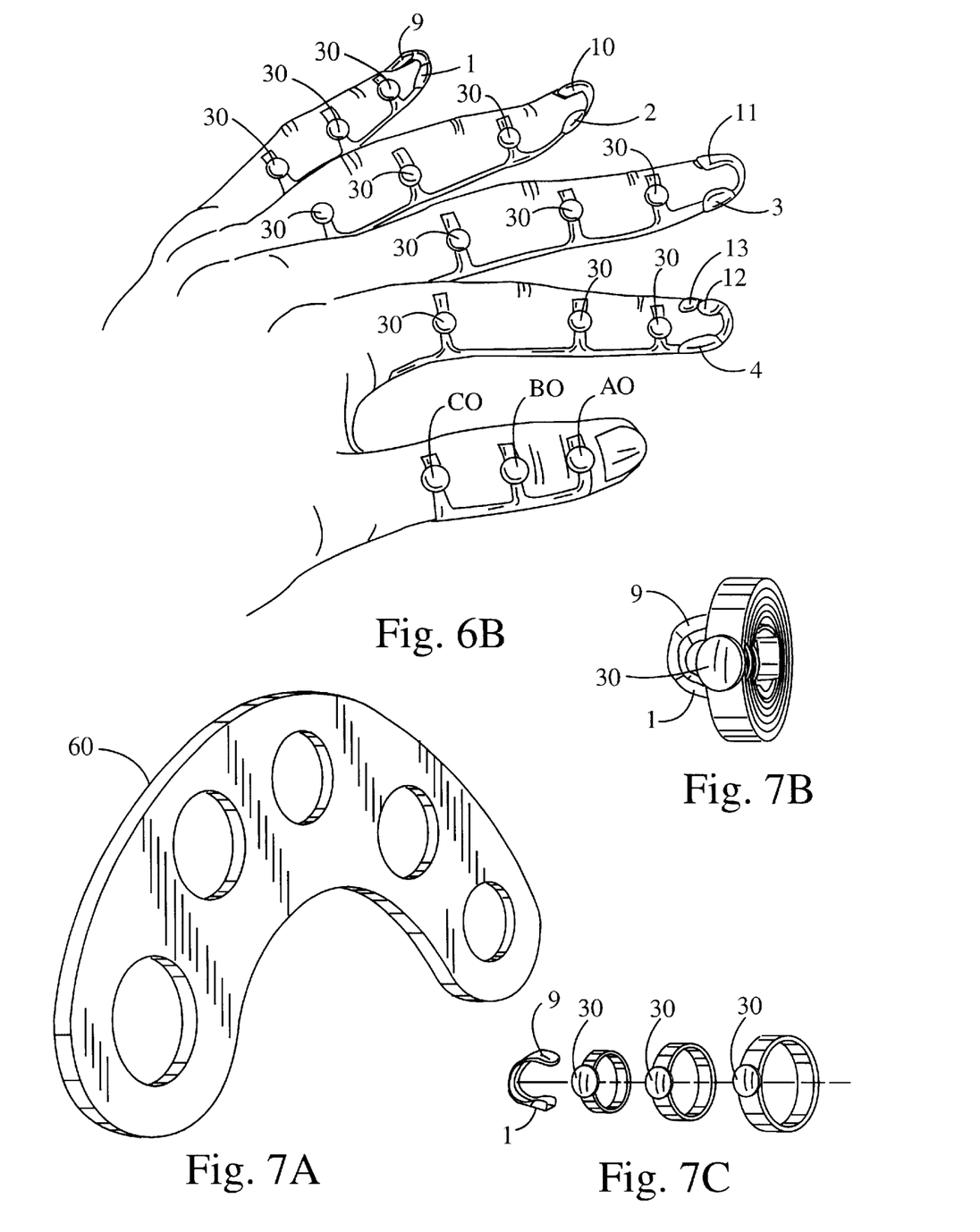
FIGS. 7A–7D illustrate a third embodiment of the present invention wherein the contacts are attached to rings that are placed on the user's fingers and thumbs.

FIGS. 6A–6B illustrate an alternative configuration having the contacts mounted on clips or half-rings. The clips are attached to a skeletal structure 50. The keyboard encoder and transfer electronics (e.g., wireless transmission electronics) are also mounted to the skeletal structure 50. FIG. 6A shows an exemplary skeletal structure 50 for the left hand. A similar structure is used for the right hand. The skeletal structure 50 rests against the user's palms (or alternatively on the back of the user's hand) and the contacts are positioned on the user's fingers by placing the clips (on which the contacts are mounted) around the user's fingers and thumbs as shown in FIG. 6B. The clips can be attached to the skeletal structure 50 in a way that allows adjustment of the positions of the clips in order to accommodate different finger and thumb lengths. The skeletal structure 50 can also be adjustable in order to accommodate hands of varying sizes. The main purpose of the skeletal structure is to preserve the integrity of the overall system.

Figure 7D:
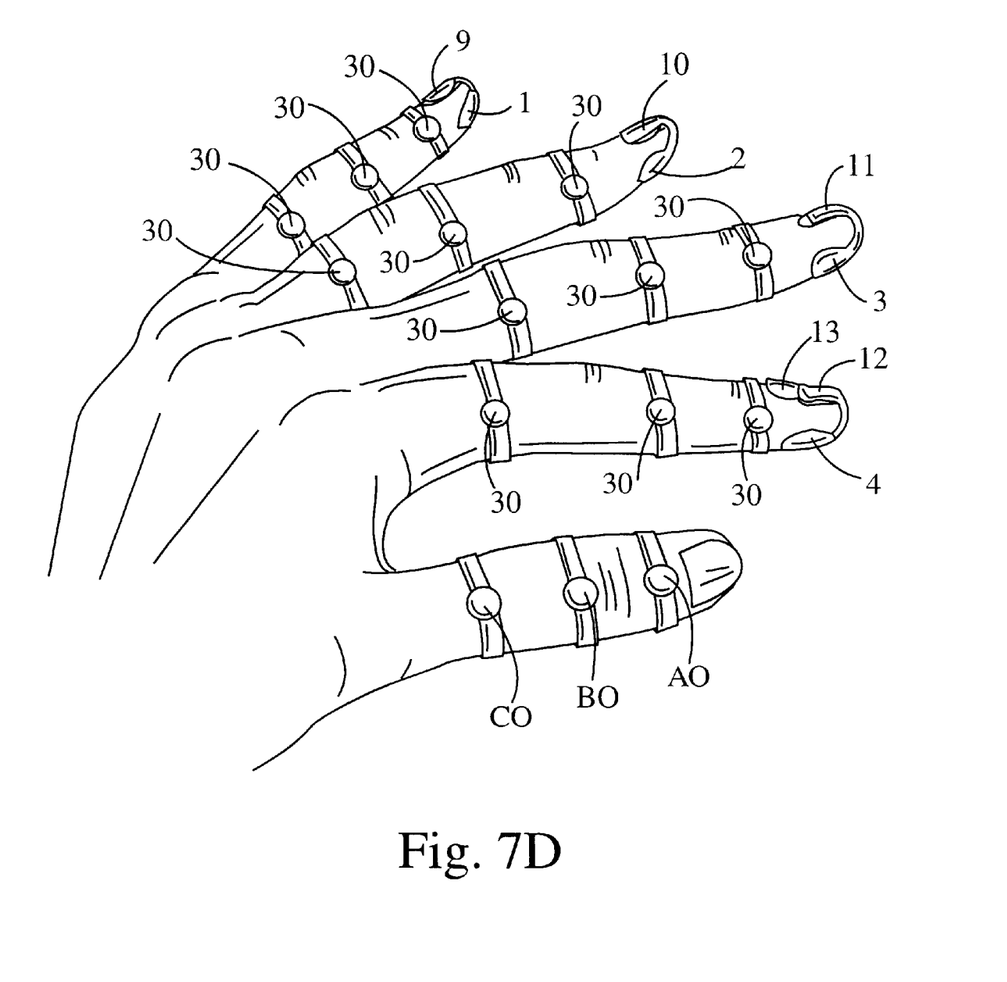

In another embodiment the contacts are located on full rings, as shown in FIGS. 7A–7D. The figures illustrate rings for a user's left hand. There is a comparable set of rings for the user's right hand. The full rings are sized to fit at specific locations along a user's fingers. The rings are connected together, for example, via thin, flexible wires. The wire for the contact on one ring connects to the next larger ring on the same finger, and finally to the encoder and to the transmission electronics. For example, the contacts on the smallest ring (clip that goes over the user's fingertip) connects to the smallest full ring, the medium full ring, the largest full ring, and then to the encoder and transfer electronics. The wires may be spiral wires with windings nested inside each other when the rings are nested. When the rings are placed on the user's fingers, the spirals stretch axially to resemble springs winding around each finger. While the rings could each be put on individually, the rings may be placed on the user's fingers using an application device 60, such as the one shown in FIG. 7A. The rings are nested together as shown in FIGS. 7B–7C. The nested rings are placed in the holes of application device 60. The application device 60 having the nested rings in place in the holes is then placed on the user's hand and removed. When the device is removed, a release mechanism ensures that the rings remain on the user's fingers and thumbs at the appropriate locations as shown in FIG. 7D. Removal of the ring contacts is achieved by placing the application device 60 on the base of the fingers, after which the release mechanism in unlocked. Stripping the application device 60 off the fingers then collects the rings. The "rings" worn on the tip of the user's fingers will typically include two or three contacts 1–18. These "rings" worn on the tips of the user's fingers may be attached to the smallest of the three rings that include the supplemental finger contacts 30. The rings may be flexible in order to allow for slight variations in diameter in order to accommodate different finger and thumb sizes.

Figure 8A:
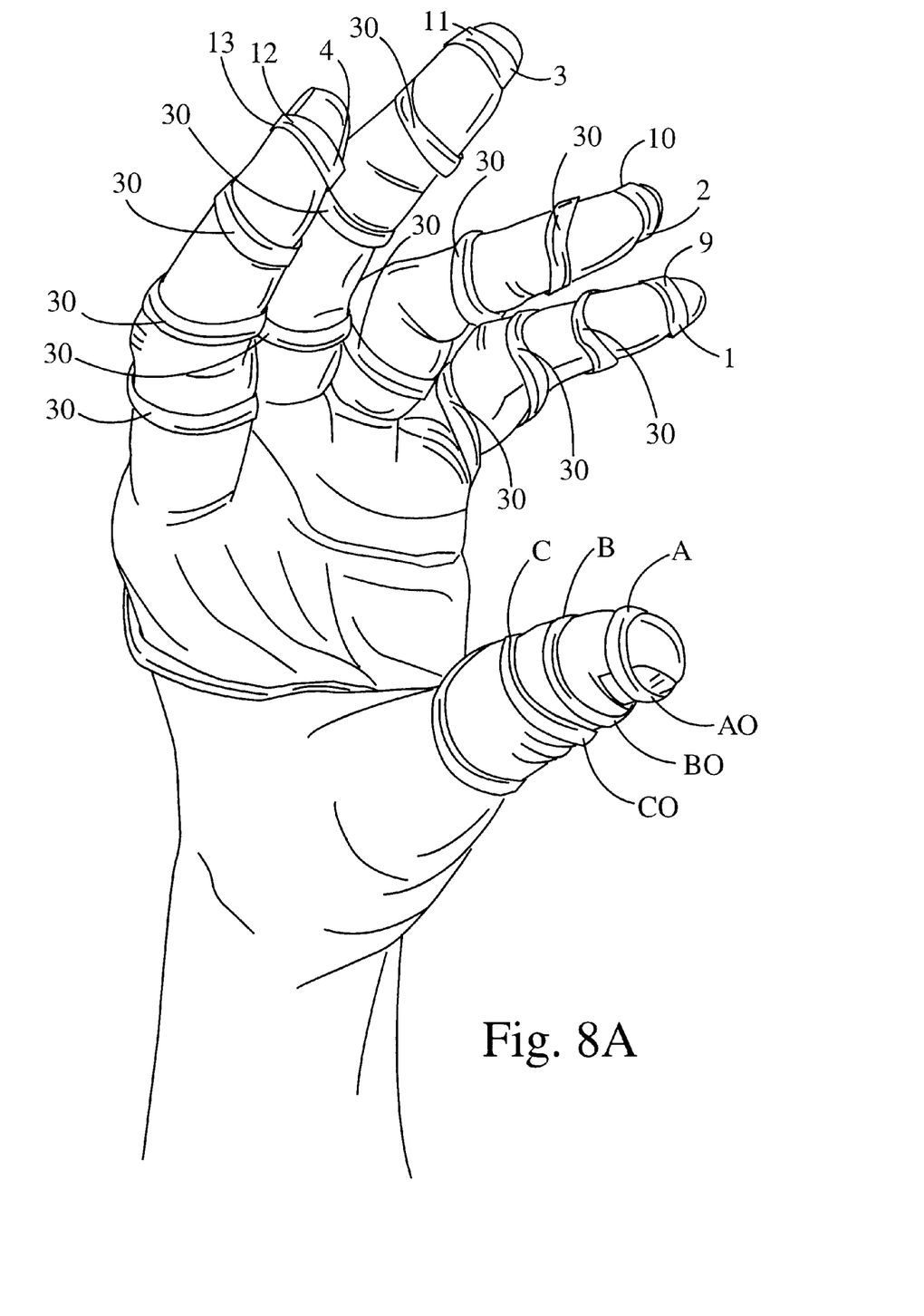
FIGS. 8A–C illustrate a fourth embodiment of the present invention using a flexible skeletal structure composed of spiraling thin bands (one for each finger) with imprinted electrical wires.
Figure 8B:
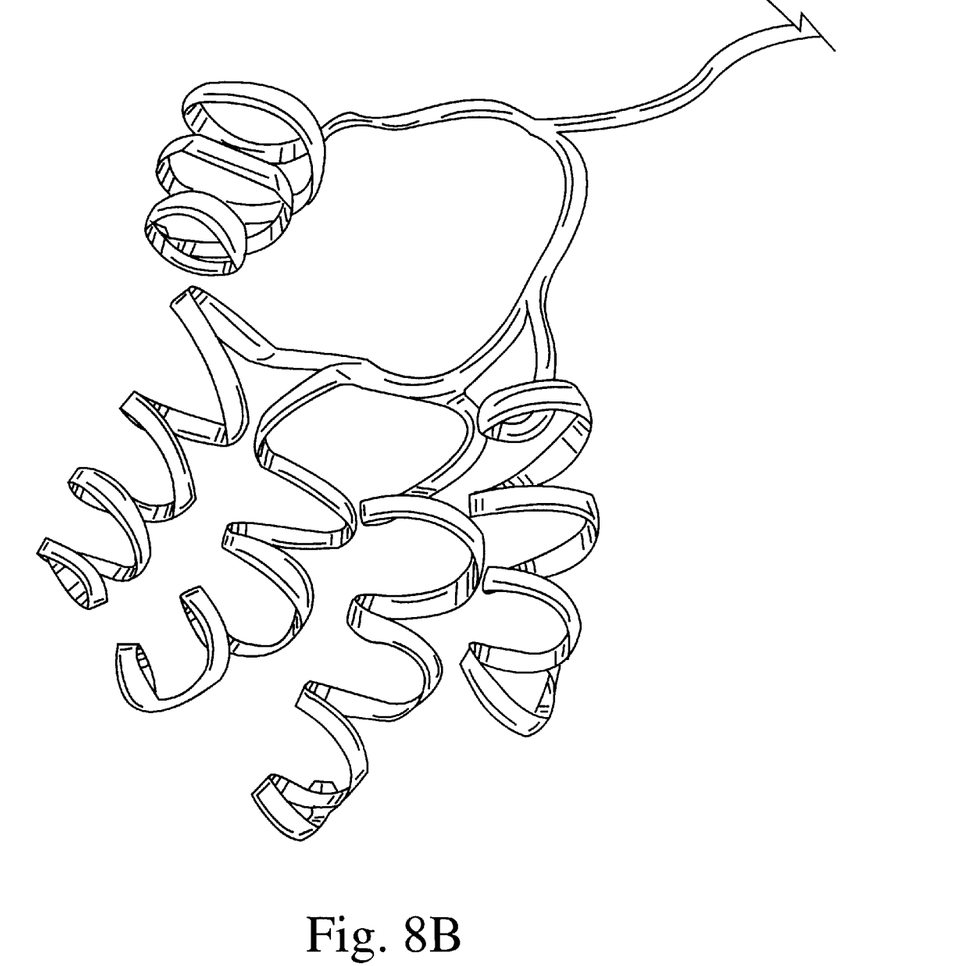
Figure 8C:
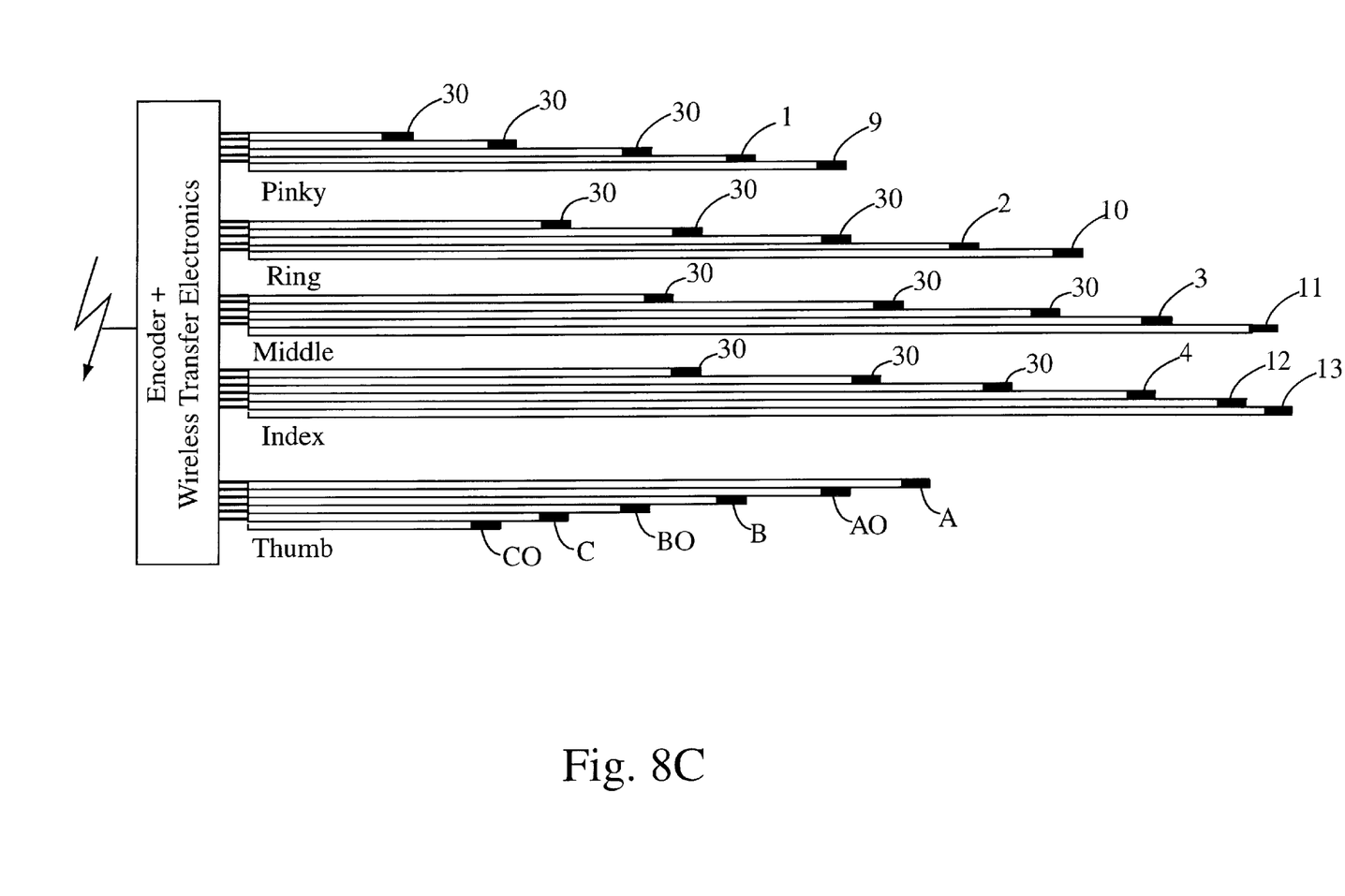

Another embodiment of a skeletal structure design is shown in FIGS. 8A–8C. The illustrations show the flexible skeletal structure for the left hand. There is a similar structure for the right (not shown). This configuration utilizes printed-circuit electrical wires on flexible spiral-shaped substrate strips. The wiring is shaped to provide one winding for each finger segment and three windings for the outermost thumb segment. On the fingers, each winding carries one of the supplemental contacts 30 as well as two or three additional contacts at the end of each spiral, i.e., near the tip of each finger. On the thumbs each winding carries two contacts A and A0, B and B0, or C and C0. The wires for each finger and thumb are connected to the encoder, the latter being connected also to the transfer electronics. A configuration such as the one shown in FIGS. 8A and 8B requires a finite stiffness or rigidity in order to preserve its shape when removed from the hand. The latter is necessary so that the user will be able to place his or her fingers through the spirals before beginning to use the unit. On the other hand, the wire structure should be flexible enough to allow ease of use of the device when placed on the fingers. In other words, the restrictions on freedom of finger movement should be minimized. FIG. 8B illustrates the flexible skeletal structure when not in use. The flexible structure retains its general shape but bends with finger movement when placed on a user's fingers, as shown in FIG. 8A. FIG. 8C is a diagram showing the printed electrical wires and contacts on unwound spirals which are made of a flexible substrate.

It will be appreciated that various configurations of contacts can be used with any of the structural configurations (e.g., glove, skeletal structure or rings). For example, any of the structural configurations may or may not include supplemental contacts 9–18. It will also be appreciated that the contacts may be visually marked, for example using sign and/or color coding, in order to provide an indication of the keys represented by the contact.

As described above, the present invention includes contacts on both of the user's hands to simulate the fingering used on a standard keyboard, such as a QWERTY keyboard (particularly for characters A–Y). It will be appreciated that the present invention can also be configured to be used on one of the user's hands to simulate a half-keyboard. The contacts on the hand being used (either right or left) would be the same as the configuration of contacts when the present invention is configured in the two-handed configuration as described above. The one-handed configuration includes an additional sensor. Preferably, the additional sensor is located on the wrist and measures the angle of the wrist with respect to a virtual axis between the wrist/lower arm joint and the lower arm/upper arm joint whereby a positive wrist angle represents one-half of the keyboard (e.g., the right half) and zero or a negative value represents the other half (e.g., left half) of the keyboard. The user would contact the contacts on the fingers and thumb as described above. For one half of the keyboard (e.g., the left half), the user's wrist would be in a normal (or down) position. To toggle to the other set of characters (e.g., the right side of the keyboard), the user would move his wrist to an up position. Also, in the prescribed one-handed configuration the shift contact is modified so that pressing the shift contact will lock the shift command and pressing the shift contact a second time will unlock the shift command.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A finger mounted data entry device for a user to enter information into a computing device, the data entry device mounted on at least one of a user's two hands, each of the user's hands having a plurality of fingers and one thumb, and a palm-side and a back-side, the data entry device being adapted to accept data entry in a manner mimicking a standard keyboard that generates a signal representing a character corresponding to a key selected from a plurality of keys arranged in a base row of keys, an upper row of keys and a lower row of keys, the data entry device comprising:

two sets of thumb contacts positioned on respective ones of the user's thumbs, each set of thumb contacts including a first thumb contact which represents the base row of keys, a second thumb contact which represents the upper row of keys, and a third thumb contact which represents the lower row of keys; and a plurality of finger contacts positioned on respective ones of the user's fingers such that contact between any one of the finger contacts and the first thumb contact on the same hand generates a signal equivalent to the signal that would be generated if touch typing was used by the user to press a corresponding key in the base row of keys, contact between any one of the finger contacts and the second thumb contact on the same hand generates a signal that is equivalent to the signal that would be generated if touch typing was used by the user to press a corresponding key in the upper row of keys, and contact between any one of the finger contacts and the third thumb contact on the same hand generates a signal that is equivalent to the signal that would be generated if touch typing was used by the user to press a corresponding key in the lower row of keys.

2. The data entry device of claim 1, wherein the finger contacts are each positioned on the palm-side of the user's hand proximate a tip of a respective one of the user's fingers.

3. The data entry device of claim 1, further comprising a plurality of supplemental finger contacts, wherein contact of the one of the supplemental finger contacts with one of the thumb contacts on the same hand mimics a key on at least one additional row of keys on the standard keyboard.

4. The data entry device of claim 3, wherein each of the supplemental finger contacts is positioned proximate a nail located on the back-side of a respective one of the user's fingers.

5. The data entry device of claim 3, wherein the at least one additional row of keys includes digits 0–9.

6. The data entry device of claim 1, wherein each set of the thumb contacts further comprises a fourth thumb contact which represents additional keys on the base row of keys, a fifth thumb contact which represents additional keys on the upper row of keys, and a sixth thumb contact which represents additional keys on the lower row of keys.

7. The data entry device of claim 6, wherein the fourth and fifth thumb contacts are used in combination with the finger contacts to represent a fourth row of keys located above the upper row of keys on the standard keyboard.

8. The data entry device of claim 7, wherein the fourth row of keys includes numeric keys.

9. The data entry device of claim 1, wherein the signal generated is transmitted to the computing device.

10. The data entry device of claim 1, further comprising a plurality of supplemental finger contacts positioned on respective ones of the user's fingers and used for producing signals representing special characters.

11. The data entry device of claim 10, wherein three supplemental finger contacts are disposed on each finger.

12. The data entry device of claim 11, wherein one supplemental finger contact on each of the user's fingers is located proximate an inner first segment of the user's finger, one supplemental finger contact is located proximate an inner second segment of the user's finger and one supplemental finger contact is located proximate an inner third segment of the user's finger.

13. The data entry device of claim 1, wherein the standard keyboard is a QWERTY keyboard.

14. The data entry device of claim 1, wherein the finger contacts and thumb contacts are attached to a glove that is worn by the user.

15. The data entry device of claim 1, wherein the finger contacts and the thumb contacts are attached to a flexible skeletal structure that is worn by the user.

16. The data entry device of claim 15, wherein the flexible skeletal structure comprises clips configured to hold the finger contacts and the thumb contacts at prescribed positions on the user's fingers and thumbs.

17. The data entry device of claim 15, wherein the flexible skeletal structure is comprised of thin flexible spirals carrying imprinted electrical wires, the thin flexible spirals worn around each finger.

18. The data entry device of claim 1, wherein the finger contacts and the thumb contacts are located on rings that are worn on the user's fingers and thumbs.

19. The data entry device of claim 18, wherein the rings on each finger are connected to each other and to a signal encoder via flexible wires.

20. The data entry device of claim 19, wherein the flexible wires are spiral wires.

21. The data entry device of claim 18, wherein an application and retrieving device is used for placing the rings on or removing the rings off of the user's fingers and thumbs.

22. The data entry device of claim 1, wherein the thumb contacts and finger contacts are positioned on the fingers and thumbs of both of the user's hands.

23. The data entry device of claim 1, wherein:
the thumb contacts and the finger contacts are positioned on one of the user's hands; and further comprising:
a sensor configured to detect positioning of the user's hand having the contacts, the sensor toggling between two sets of characters, a first set of characters being equivalent to a first set of characters on a half-keyboard in a first configuration and a second set of characters being equivalent to a second set of characters on the half-keyboard in a second toggled configuration.

24. A method for a user to enter information into a computing device without using a keyboard, the method mimicking touch typing on a standard keyboard and comprising the steps of:
 a) positioning a plurality of finger contacts on the user's fingers and a plurality of thumb contacts on the user's thumbs;
 b) establishing contact between one of the finger contacts and a respective one of the thumb contacts of the same hand to generate a signal that is equivalent to a signal that would be generated by pressing a key on the standard keyboard using conventional keyboard fingering;
 c) generating a signal that is equivalent to the signal that would be generated by pressing the key on the standard keyboard using conventional keyboard fingering in response to establishing contact between the finger contact and the thumb contact; and
 d) transmitting the generated signal to the computing device.

25. The method of claim 24, wherein the standard keyboard is a QWERTY keyboard.

26. The method of claim 24, wherein the finger contacts and thumb contacts are attached to a glove that is worn by the user.

27. The method of claim 24, wherein the finger contacts and the thumb contacts are attached to a flexible skeletal structure that is worn by the user.

28. The method of claim 27, wherein the flexible skeletal structure comprises clips configured to hold the finger contacts and the thumb contacts at prescribed positions on the user's fingers and thumbs.

29. The method of claim 27, wherein the flexible skeletal structure is comprised of thin flexible spirals carrying imprinted electrical wires, the thin flexible spirals being worn around each of the user's fingers.

30. The method of claim 24, wherein the finger contacts and the thumb contacts are located on rings that are worn on the user's fingers and thumbs.

31. The method of claim 24, wherein the thumb contacts and finger contacts are positioned on the fingers and thumbs of both of the user's hands.

32. The method of claim 24, wherein:
the thumb contacts and the finger contacts are positioned on one of the user's hands;
wherein a sensor is configured to detect positioning of the user's hand having the contacts, the sensor toggling between two sets of characters, a first set of characters being equivalent to a first set of characters on a half-keyboard in a first configuration and a second set of characters being equivalent to a second set of characters on the half-keyboard in a second toggled configuration.

* * * * *